United States Patent
Al-Nakhli et al.

(10) Patent No.: US 11,441,063 B1
(45) Date of Patent: Sep. 13, 2022

(54) METHOD TO REMOVE WELLBORE DAMAGE USING THERMOCHEMICAL FLUID

(71) Applicant: SAUDI ARABIAN OIL COMPANY, Dhahran (SA)

(72) Inventors: Ayman R. Al-Nakhli, Dhahran (SA); Rayed M. Zayer, Dhahran (SA); Ahmad S. Busaleh, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/224,679

(22) Filed: Apr. 7, 2021

(51) Int. Cl.
*E21B 37/06* (2006.01)
*C09K 8/52* (2006.01)
*E21B 49/00* (2006.01)
*E21B 36/00* (2006.01)

(52) U.S. Cl.
CPC .............. *C09K 8/52* (2013.01); *E21B 36/008* (2013.01); *E21B 37/06* (2013.01); *E21B 49/008* (2013.01)

(58) Field of Classification Search
CPC ......... C09K 8/52; E21B 36/008; E21B 37/06; E21B 49/008
See application file for complete search history.

(56) References Cited

U.S. PATENT DOCUMENTS

| | | |
|---|---|---|
| 4,151,878 A | 5/1979 | Thomas |
| 4,343,363 A * | 8/1982 | Norton .................. E21B 43/261 166/295 |
| 5,232,050 A * | 8/1993 | Gidley ..................... C09K 8/72 166/312 |
| 5,580,391 A | 12/1996 | Franco et al. |
| 5,891,262 A | 4/1999 | Khalil et al. |
| 9,228,424 B2 | 1/2016 | Zavolzhskiy et al. |
| 9,963,631 B2 | 5/2018 | Al-Nakhli et al. |
| 10,030,492 B2 | 7/2018 | Al-Nakhli et al. |
| 10,053,614 B2 | 8/2018 | Al-Nakhli et al. |
| 10,895,136 B2 * | 1/2021 | Al-Nakhli ............... E21B 43/25 |

(Continued)

OTHER PUBLICATIONS

Yang, F. et al., "Acidizing Sandstone Reservoirs Using HF and Formic Acids", SPE 150899, Society of Petroleum Engineers, Feb. 2012, pp. 1-23 (23 pages).

(Continued)

*Primary Examiner* — Silvana C Runyan
(74) *Attorney, Agent, or Firm* — Osha Bergman Watanabe & Burton LLP (57) ABSTRACT

A method for the removal of well bore damage, the method including performing an acid cleaning of one or more of a coiled tubing and the well bore using a hydrochloric acid mixture of 7 to 15 wt % hydrochloric acid and displacing the hydrochloric acid mixture with a first fresh water stream. After acid cleaning, a composition comprising at least 10 wt % acetic acid into the wellbore is injected into the wellbore. After injecting acetic acid, gel jetting of the well is performed with a gel mixture, and the gel mixture is subsequently displaced with a second fresh water stream. After gel jetting, an organic solvent mixture is injected into the well bore and allowing the organic solvent mixture to soak for 2 to 6 hours. Finally, a thermochemical mixture is injected into the well bore, thereby increasing temperature and pressure and cleaning build up from the well bore.

11 Claims, 4 Drawing Sheets

(56) References Cited

U.S. PATENT DOCUMENTS

| | | | | |
|---|---|---|---|---|
| 2004/0014606 A1* | 1/2004 | Parlar | ............. | E21B 43/20 |
| | | | | 507/100 |
| 2006/0131022 A1 | 6/2006 | Rae et al. | | |
| 2008/0069961 A1 | 3/2008 | Sarkar et al. | | |
| 2016/0319182 A1* | 11/2016 | Al-Nakhli | ............. | C09K 8/528 |
| 2018/0320054 A1* | 11/2018 | Al-Nakhli | ............. | C09K 8/532 |

OTHER PUBLICATIONS

Zhou, L. and H.A. Nasr-El-Din, "Acidizing Sandstone Formations Using a Sandstone Acid System for High Temperatures", SPE 165084, Society of Petroleum Engineers, Jun. 2013, pp. 1-15 (15 pages).

International Search Report Issued in Corresponding Application No. PCT/US2022/023777, dated Jul. 6, 2022, 5 pages.

Written Opinion Issued in Corresponding Application No. PCT/US2022/023777, dated Jul. 6, 2022, 8 pages.

* cited by examiner

METHOD TO REMOVE WELLBORE DAMAGE USING THERMOCHEMICAL FLUID

BACKGROUND

In the drilling of oil wells, drilling fluid is used to aid in the drilling of boreholes into the earth. The liquid drilling fluids, which are often referred to as drilling muds, are classified into three main types of muds. They are (1) water-based muds, which can be either dispersed or non-dispersed, (2) non-aqueous muds, usually referred to as oil-based mud and (3) gaseous drilling fluid which includes a wide range of gaseous materials.

The drilling fluid serves many roles, including providing a hydrostatic pressure to prevent the fluids in the formation from entering the wellbore, keeping the drill bit cool and clean during the drilling operation, the carrying out of drill cuttings and to suspend the drill cuttings when drilling is halted during removal and re-entry of the drilling assembly. The particular drilling fluid or mud that is employed is chosen carefully for its particular function in to order avoid damage to the reservoir formation, limit corrosion and determine filtration rate and filter cake properties.

During the drilling operation, reservoir drilling fluid is circulated within the drilling equipment to cool the drill bit, reduce friction between the drill string and the sides of the borehole, and to form a filter cake to prevent filtrate leak-off into the formation. The driving force for the formation of well damage such as filter cake, induced organic scale, or inorganic scale is the higher pressure applied to maintain the stability of the borehole.

Well cleanup and removal of the damage is the first stage in well completion operations, and in this process the damage is cleaned from the well. Drilling fluid filter cake or other scale build up is formed during the drilling process in the overbalanced drilling operations due to the difference between the hydrostatic drilling fluid pressure and reservoir pressure. This pressure difference will form an impermeable filter cake and thin layer that will prevent the flow of oil and gas from the reservoir to the wellbore. The drilling fluid residue (the impermeable thin layer or filter cake) should be removed during the well cleanup operations to allow the reservoir fluids to flow from the reservoir to the wellbore and then to the surface.

The drilling fluid also will cause damage to the reservoir due to the invasion of its base fluid (water or oil) and some of the weighting materials, polymers, etc. These ingredients of the drilling fluid (weighting materials, base fluid, polymers, etc.) will flow through the reservoir until the filter cake is formed. The flow of these ingredients to the reservoir will form a layer of reduced permeability around the wellbore; this layer of reduced permeability is called a skin. In addition to the skin damage, other damaging mechanisms can be introduced during the drilling process such as wettability alteration in the near-wellbore area, formation of emulsions, and clay swelling. The problem of well cleanup becomes severe and more difficult in horizontal wells compared to vertical wells. This can be attributed to the longer contact between the drilling fluid and the reservoir section during horizontal drilling.

The thin layer, impermeable filter cake will impose an additional resistance to the formation fracturing, especially in long and extended reach horizontal well. This layer adds more strength to the wellbore and will increase the breakdown pressure required to break the reservoir in tight formations as well as in permeable formations.

Further, produced water contains oil droplets, suspended materials, and residue from water treatment chemicals. This combination of substances can also result in several damaging mechanisms that can affect the injectivity in disposal wells.

The presence of oil and corrosion products in the injected water can impact the injectivity in disposal well by one or combination of the following mechanisms: reduction in relative permeability to water, plugging of porous media, and wettability alteration.

Suspended solid particles can impair injectivity in disposal wells by well bore narrowing (external filter cake), deep invasion of particulate (internal filter cake), wellbore fill up, and perforation plugging. Particulate in produced water can be small sand grains or corrosion products from the tubulars. Additionally, some particulate exists in well bores due to filter cake residues. Other particulates precipitate due to some chemical interactions. For example, iron sulfide may precipitate as a result of chemical reaction between iron from corrosion products and $H_2S$ that is dissolved in the water or generated in the wellbore by sulfite reducing bacteria (SRB). The plugging by these particulates is caused by mechanical entrapment.

For years a mud acid, such as hydrofluoric acid, has been used to clean the well bore of these damaging layers. However, these chemicals are very toxic, may cause environmental damage, and often do not clean all the damage.

SUMMARY

In one aspect, embodiments disclosed herein relate to a method for the removal of well bore damage the method including conducting a pre-treatment injectivity test to measure injectivity, performing an acid cleaning of one or more of a coiled tubing and the well bore using a hydrochloric acid mixture of 7 to 15 wt % hydrochloric acid, displacing the hydrochloric acid mixture with a first fresh water stream, injecting a composition comprising at least 10 wt % acetic acid into the wellbore, performing gel jetting of the well with a gel mixture, and displacing the gel mixture with a second fresh water stream, injecting an organic solvent mixture into the well bore and allowing the organic solvent mixture to soak for 2 to 6 hours, and injecting a thermochemical mixture into the well bore, thereby increasing temperature and pressure and cleaning build up from the well bore.

In other aspects, embodiments disclosed herein relate to a method for removing well bore damage. The method includes injecting a thermochemical mixture into a first targeted zone of the well bore, initiating a first thermochemical reaction and increasing the temperature in the well bore by 75-86° C. (135-155° F.), soaking the first thermochemical mixture in the first targeted zone of the well bore for 1 to 6 hours, producing a first solubilized sludge, and removing the first solubilized sludge from the wellbore. The method further includes injecting a second thermochemical mixture into a second targeted zone of the well bore, initiating a thermochemical reaction and increasing the temperature in the well bore by 86-125° C. (155-225° F.), wherein the second targeted zone may be the same or different than the first targeted zone, and wherein the second thermochemical mixture may be the same or different than the thermochemical mixture, soaking the second thermochemical mixture in the second targeted zone of the well bore for 1 to 6 hours, producing a second solubilized sludge, and removing the second solubilized sludge from the wellbore. The method additionally includes injecting a third thermochemical mixture into a third targeted zone of the well bore, initiating a thermochemical reaction and increasing the temperature in the well bore by 194-222° C. (350 to 400° F.), wherein the third targeted zone may be the same or different than the first or second targeted zones, and wherein the third thermochemical mixture may be the same or different than the first thermochemical mixture or the second thermochemical mixture, soaking the third thermochemical mixture in the well bore for 1 to 4 hours, producing a third solubilized sludge, and removing the third solubilized sludge from the wellbore.

Other aspects and advantages will be apparent from the following description and the appended claims.

DETAILED DESCRIPTION

As noted above, well cleanup or damage removal is the first stage in well completion operations. In some embodiments, the drilling fluid residue (the impermeable thin layer of scale build up or filter cake) is desired to be removed during the well cleanup operations in order to allow the reservoir fluids to flow from the reservoir to the well bore and then to the surface. In other embodiments, it is desired to remove the residue in order to improve the injectivity of the well bore.

Properties of this build up, such as thickness, toughness, slickness and permeability, are important because the layer that forms on permeable zone in the wellbore, can cause the pipe to stick and other drilling problems. If the damage created during the drilling process is not removed prior to or during completion of the well, reservoir productivity will be compromised.

Inefficient removal of filter cake or scale build up will impose a difficulty for the fracture operations after drilling because impermeable features will increase the required pressure to fracture formations. Failures to breakdown formations may be due to existing filter cake or scale build up.

The conventional way of treating damage with both organic and inorganic material in sandstone formation is based on using mud acids, such as hydrofluoric acid, to remove formation damage. In many cases the conventional method did not show satisfactory results. For this reason, an exothermic chemical has been developed to treat such wells. The exothermic reaction chemicals generate heat, pressure, and solvents that are used to break down the thick or viscous material formed on the sand face and perforations. The high temperature helps to reduce the viscous forces of the organic mass of the damaging material and fragment it for easier removal. Heat also accelerates the effect of organic solvents. With the help of generated pressure, perforations may be cleaned and fragments can be flowed back easily without the need for external processes, such as nitrogen kicks.

Accordingly, disclosed herein are methods and systems for using a heat generating fluid to remove the damage that have been developed as an alternative to conventional matrix stimulation for sandstone and carbonate formations. The method includes triggering an exothermic chemical reaction in-situ to generate heat in the presence of an organic solvent. Generated heat along with solvents dissolve near wellbore damage; while any generated pressure provides lifting energy to flowback the well, therefore, improving well injectivity/productivity. Moreover, localized pressure may brush damaging residue away from wellbore which may improve formation permeability. The new developed treatment may eliminate the use of toxic mud acid and may be more environmentally friendly. Further, this process may help to avoid sidetracking wells and reduce flowback time by treating the well with three stages of thermochemicals to produce a more homogenous stimulation.

The method of cleaning well bore damage according to embodiments disclosed herein, which were developed in conjunction with a well testing procedure, may include four steps: a) clean up to remove fillings, b) first stage treatment, c) second stage treatment, and d) third stage treatment.

Wellbore Cleanup

Prior to the treatment, an injectivity test may be conducted to measure initial injectivity and compare it with the final injectivity. In doing so, any increase in injectivity may be measured. If a coiled tubing is going to be used for injecting the thermochemicals into the well bore, the coiled tubing may undergo acid cleaning such the tube is cleaned prior to use. The acid cleaning may be performed by injecting 7-15 wt % HCl through the coiled tubing. The balance of the acid solution may be water with trace amounts of corrosion inhibitors, iron controllers, and surfactants. The amount of acid solution injected through the coiled tubing will depend on the length and diameter of the tube, but may generally be between 0.1 gallons per foot of tubing length to 1 gallon per foot of tubing length. After the HCl has been injected through the coiled tube, fresh water is injected through the tube to remove any remaining HCl.

Whether coiled tubing is used or not, the well bore may also undergo acid cleaning prior to injection of thermochemicals. The acid cleaning of the well bore removes any loose surface material, and prepares the well bore face for damage removal. The well bore acid cleaning may be performed by injecting 7-15 wt % HCl through the well bore. The balance of the acid solution may be water with trace amounts of corrosion inhibitors, iron controllers, and surfactants. The amount of acid solution injected will depend on the length and diameter of the well bore, but may generally be between 0.1 gallons per foot of length to 1 gallon per foot of length. After the HCl has been injected, fresh water may be circulated through the well bore to remove any residual HCl.

Upon completion of the acid cleaning and fresh water circulation, acetic acid may be injected into the well bore to start breaking down near surface damage. The acetic acid may be from 5 wt % to 15 wt %, and injected at a volume of 2 to 6 gallons per foot.

After injection of the acetic acid, a wellbore cleanout using a jetting process may be carried out. During the cleanout, a viscous gel may be pumped and circulated through the well to remove some or all of the filling material, as well as any surface damage removed by the acetic acid. The jetting may be conducted, for example, with a gel having 60-120 parts per thousand xanthan to ammonium chloride. By way of example only, two such gel compositions are listed in Table 1 below. After jetting is complete, the remaining gel is displaced with fresh water.

TABLE 1

|  | Per 1,000 gal | bbl |
|---|---|---|
| Gel 20 | | |
| Fresh Water | 967 | Gal |
| Ammonium Chloride | 333 | Lbs |
| Xanthan | 20 | Lbs |
| Surfactant | 2 | Gal |
| Gel 40 | | |
| Fresh Water | 965 | Gal |
| Ammonium Chloride | 333 | Lbs |
| Xanthan | 40 | Lbs |
| Surfactant | 2 | Gal |

The final step in well cleanup may be pumping an organic solvent into the well bore and allowing the organic solvent to soak. The organic solvent may be 25-100 wt %, with a mutual co-solvent making up the remaining 75-0 wt %, and injected at a volume of 5-15 gallons per foot. The organic solvent may be allowed to soak for 2 to 6 hours before being removed by circulating fresh water.

Organic solvents which may be used for this step in well clean up may include one or more of alcohols, fatty alcohols, fatty acids, organic acids, benzene, xylene, toluene, diesel, phenol ethoxylate, ether, cyclohexane, diisobutylketone, 2-thylhexanol, methylene chloride, dioxane, carbon disulfide, n-butanol, dimethylformamid (DMF), nitromethane, ethanol, dimethylsulfoxide, diethylene glycol, propylene glycol, n-methylpyrrolidone, isopropanol, naphthalene, or 1,2,4 Trimethylbenzene.

1$^{st}$ Stage Treatment

First stage treatment using thermochemicals may be designed to clean up and remove sludge material from a targeted portion or zone of the well bore. In some embodiments, the first stage treatment may be used to target a specific portion of the well bore, such as a lower perforated portion of the well bore. Coiled tubing may be used to inject the thermochemicals at the desired depth in the well bore. The thermochemicals, as well as their injection amounts and concentrations, may provide a thermochemical reaction which occurs that may be used to increase the temperature in the first stage treatment zone by 75-86° C. (135-155° F.), for example, and the reaction products may be allowed to soak for 1 to 6 hours. In doing so, the generated in-situ heat may be enough to solubilize the sludge materials in the targeted portion of the well bore. The well bore may then be flushed by flowing fresh water through the well bore to remove the reacted thermochemical, reaction products, and solubilized sludge.

2$^{nd}$ Stage Treatment

Second stage treatment using thermochemicals may be designed to clean up and remove sludge material or additional sludge material from a targeted portion or zone of the well bore. In some embodiments, the second stage treatment may be used to target a second portion of the well bore, such as a middle perforated portion of the well bore. Coiled tubing may again be used to inject the thermochemicals at the desired depth in the well bore. The thermochemical reaction which occurs for this second treatment may be used, for example, to increase the temperature in the second stage treatment zone by 86-125° C. (155-225° F.), and the reaction products may be allowed to soak for an additional 1 to 6 hours. As with the first stage treatment, after the thermochemical reaction products have been allowed to soak, the well bore may then be flushed by flowing fresh water through the well bore to remove the reacted thermochemical, reaction products, and solubilized sludge.

3$^{rd}$ Stage Treatment

The third stage treatment may take place in a third targeted portion or zone of the well bore. In some embodiments, the third stage treatment may take place near the well bore and may occur at all depths within the formation. During the third stage, the thermochemicals may also be forced into the formation in order to stimulate the reservoir, while removing any remaining well bore surface damage. The reaction may take place and be allowed to soak for 1 to 4 hours. During this time, the thermochemicals used in the third treatment may be used, for example, to increase a temperature in the well bore by 194-222° C. (350 to 400° F.), with an increase in pressure of between 34 to 49 bar (500 to 700 psia). This pressure may not be high enough to cause microfractures within the formation, but may be high enough to promote lifting of materials removed from the well bore face.

Following soaking, the well is allowed to flowback for 5 to 10 hours. After flowback, a final injectivity test may be performed to assess the increase in injectivity as compared to the injectivity prior to treatment.

Figure 1:
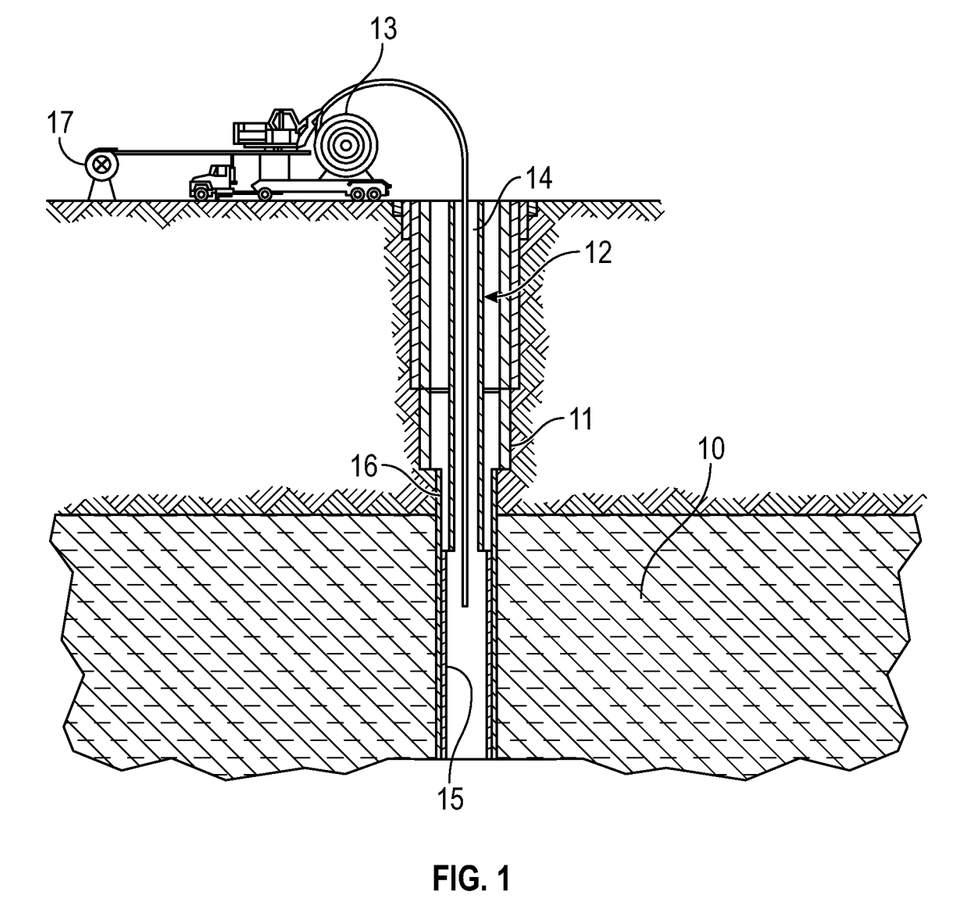
FIG. 1 is an illustration of a method of removing filter cake and scale build up according to one or more embodiments disclosed herein.

Turning now to FIG. 1, which is a schematic representation of one or more embodiments disclosed herein, an oil bearing zone 10 having a well 11 extending into the oil-bearing zone is illustrated. Production tubing 12 and a coiled tubing 13 extend down into a wellbore 14 which extends into the oil bearing zone 10.

During the drilling operation, a filter cake or scale build up 15 is formed along the well casing 16 where the filter cake or scale build up 15 meets the oil bearing reservoir 10.

After performing initial injectivity testing and well cleanup operations, thermochemical may be injected via a pump 17 through the coiled tubing 13 from one or more thermochemical storage tanks (not illustrated). The thermochemicals may have a concentration from 0.1M to 3M. In one or more embodiments, the thermochemical may be injected at a volume of 0.1 to 1 gallons per foot of well bore depth. Unlike the solutions in the prior art which include a chelating agent, embodiments disclosed herein using only a thermochemical may be used to breakdown filter cakes and scale build up.

The thermochemicals used in one or more embodiments disclosed herein may be selected from ammonium containing compounds and a nitrite containing compounds. In one or more embodiments, the ammonium containing compounds may include ammonium chloride, ammonium bromide, ammonium nitrate, ammonium sulfate, ammonium carbonate, and ammonium hydroxide, while the nitrite containing compounds may include sodium nitrite and potassium nitrite. In one or more embodiments, the thermochemicals may be ammonium chloride and sodium nitrite. In embodiments where ammonium chloride and sodium nitrite are used as the thermochemical, the ratio of ammonium chloride to sodium nitrate may be from 1:4 to 4:1, such as 1:2 to 2:1, or even 1:1 on a percent by weight (%/wt) basis.

By way of an example, to prepare sodium nitrite for the application of the thermochemical reaction component to the injection well, first 920 gallons of fresh water may be placed in a first clean tank. Then, 2,782 lbs of sodium nitrite, may be added to the fresh water under agitation. Additional fresh water may be mixed to balance to a total volume of solution of 1000 gallons, however, this step may not be necessary.

Also by way of an example, to prepare ammonium chloride for the application of the thermochemical reaction component to the injection well, first 709 gallons of fresh water may be placed in a second clean tank. Then 2,142 lbs of ammonium chloride, may be added to the tank under agitation. Additional fresh water may be mixed to balance to a total volume of solution of 1000 gallons, however, this step may not be necessary.

Once the sodium nitrite and ammonium chloride are prepared, the solutions may be injected from the first and second tanks into the well bore by coiled tubing to produce a thermochemical reaction in-situ, and reduce the viscosity of the blockage materials in the well, as described above.

The exothermic reaction can be activated by acid precursors such as, for example, organic acids like acetic acid, and inorganic acids such as hydrochloric acid. Such acid precursors can be encapsulated when they are injected such that they break down, releasing the acid precursor at a desired location. Additional precursors may include organic esters. In some embodiments, HCl can be used as an activator in addition to or alternative to acid precursors, and to help remove inorganic build up.

EXAMPLE/RESULTS

In order to develop the method disclosed herein, and select the thermochemical materials which may be used, a test on material received from a side-tracked well was performed. Initially testing was performed on a well that was side-tracked and completed as a deviated 7" cased hole water disposal well in sandstone reservoir. The lower completion consisted of 580 ft depth of a 4½" pre-perforated liner. A decrease of injectivity had been observed in this disposal well, attributed mainly to the accumulation of organic and inorganic damaging martial. To identify the type of damaging precipitates and determine an effective treatment recipe, a sample was collected from well injection line. The sample was a heterogonous thick sludge mix of dark oil and other materials. The laboratory analyses, using extraction and multi-element scanning, indicated that the sludge composition was mainly corrosion products (iron oxide and sulfides) and hydrocarbon material (asphaltene), as illustrated in Table 2, below.

TABLE 2

Compositional analysis of sludge material

| Component | Wt % |
| --- | --- |
| Asphaltene | 11.3 |
| Iron Oxides | 32.4 |
| Iron Sulfides | 21.6 |
| Sodium Chloride | 16.5 |
| Calcium Carbonate | 9.9 |
| Silica | 8.3 |

The sludge material was mixed thoroughly in a high speed blender to homogenize the material, and subjected to viscosity and API measurement. The measurement indicated a low API of about 13 and a high viscosity of about 2000 cp, indicating non-Newtonian behavior, and confirming the sludge sample was semi-solid in nature.

The viscosities were measured using a temperature controlled pressure cell. This pressure cell was used to avoid evaporation of light-end hydrocarbons while heating the crude sample. The sample was allowed to equilibrate at a set temperature for 10~15 minutes. The viscosity of the sample was then measured as a function of shear rate.

Figure 2:
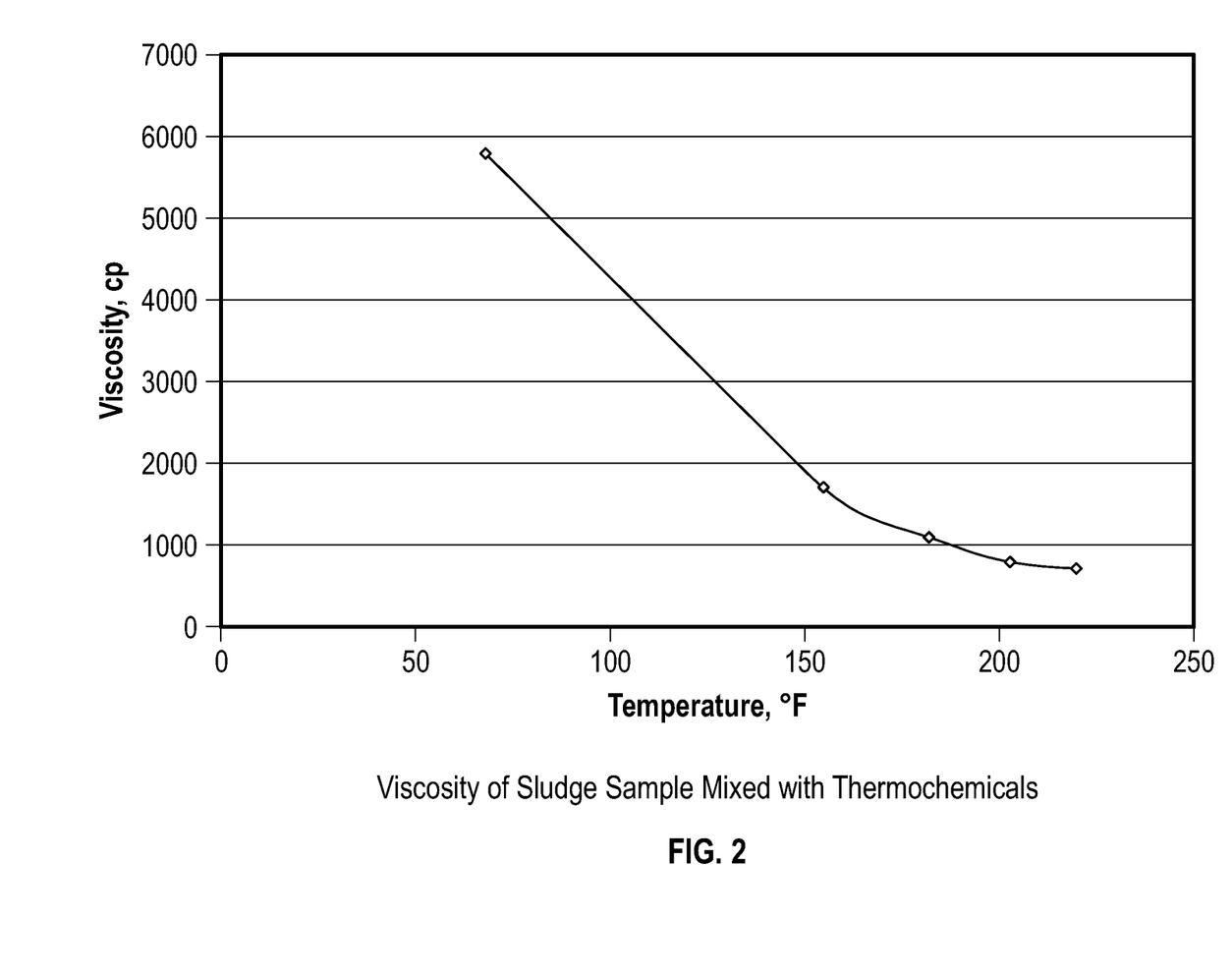
FIG. 2 is a graph of viscosity as a function of temperature according to one or more embodiments disclosed herein.

Additionally, the sludge sample was mixed with in-situ heat generating system (thermochemical) and placed inside the pressure cell. Viscosity was measured as heat was generated by the chemical reaction. Sludge viscosity was reduced from 5800 cp to 700 cp, as the cell temperature increased from room temperature to 220° F. by the chemical reaction. The results of this test are illustrated in FIG. 2. Accordingly, a thermochemical was found that could reduce the viscosity of the sludge, thereby allowing for damage removal of the well bore.

Figure 3:
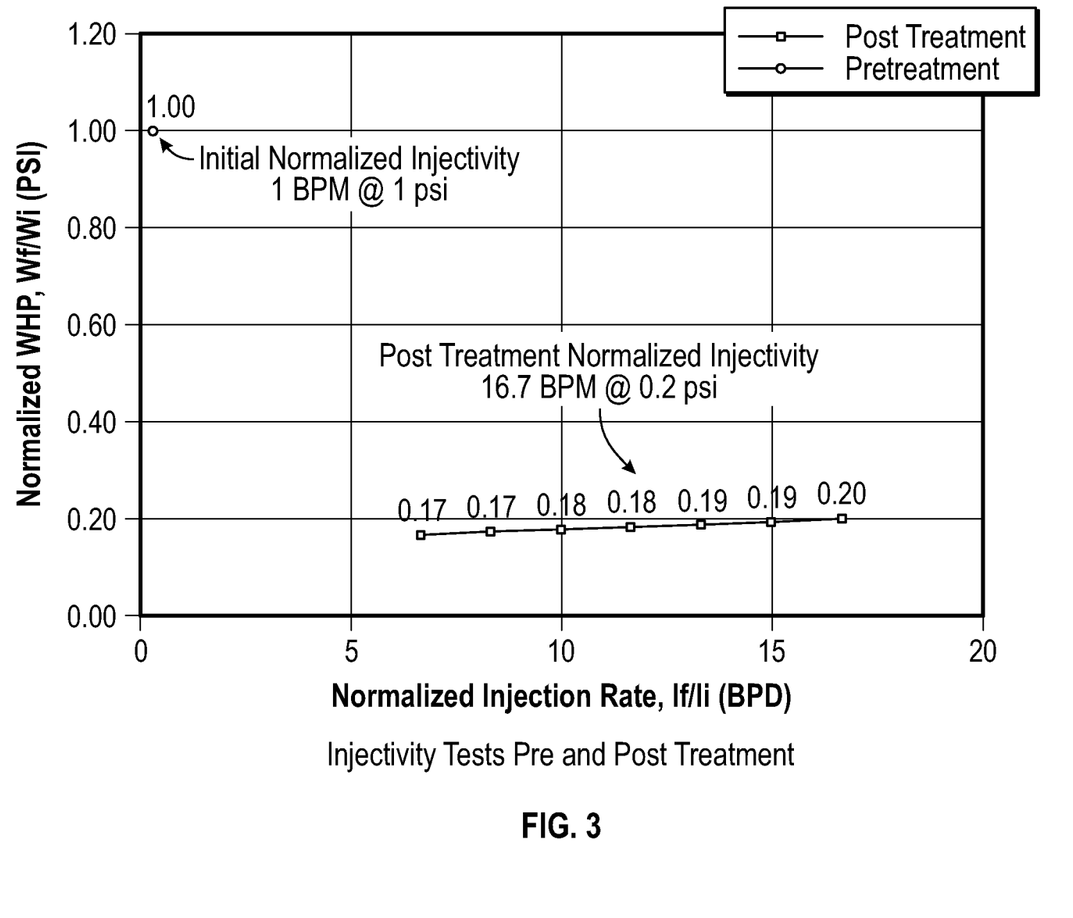
FIG. 3 is a graph of the injectivity test results according to one or more embodiments disclosed herein.

A field treatment was successfully conducted using the thermochemical treatment process, and thermochemical, as described above. The initial, normalized injectivity of 1 BPM at 1 psi (corresponding to 1,000 barrels per day) was used to assess improvement. After treatment, injectivity was measured at 16.7 BPM at 0.2 psi (corresponding to 30,000 barrels per day), an improvement of injectivity by 3,000%. See results in FIG. 3.

Flowback samples collected from the flowback were found to contain organic material, solids, and aqueous solution. Organic content analysis of the solvent confirmed that the samples contained 4.8 wt % of asphaltene and 3.2 wt % of sulfur, with API gravity of 24.6. This confirms the damage effect of asphaltene traces along with inorganic scale. The hydrocarbon cuts of the flowback sample was comparable with offshore oil producers.

Solids filtrate analysis was performed using an environmental scanning electron microscopy (ESEM), energy dispersive X-Ray microanalysis (EDS), and X-Ray diffraction (XRD) analytical techniques to characterize eight flowback samples from treated well. For microscopic characterization, environmental scanning electron microscopy integral with energy dispersive X-Ray microanalysis system was used (ESEM/EDS). For spectroscopic analysis, X-Ray powder diffraction technique was used to determine the chemical composition of tested samples.

Figure 4:
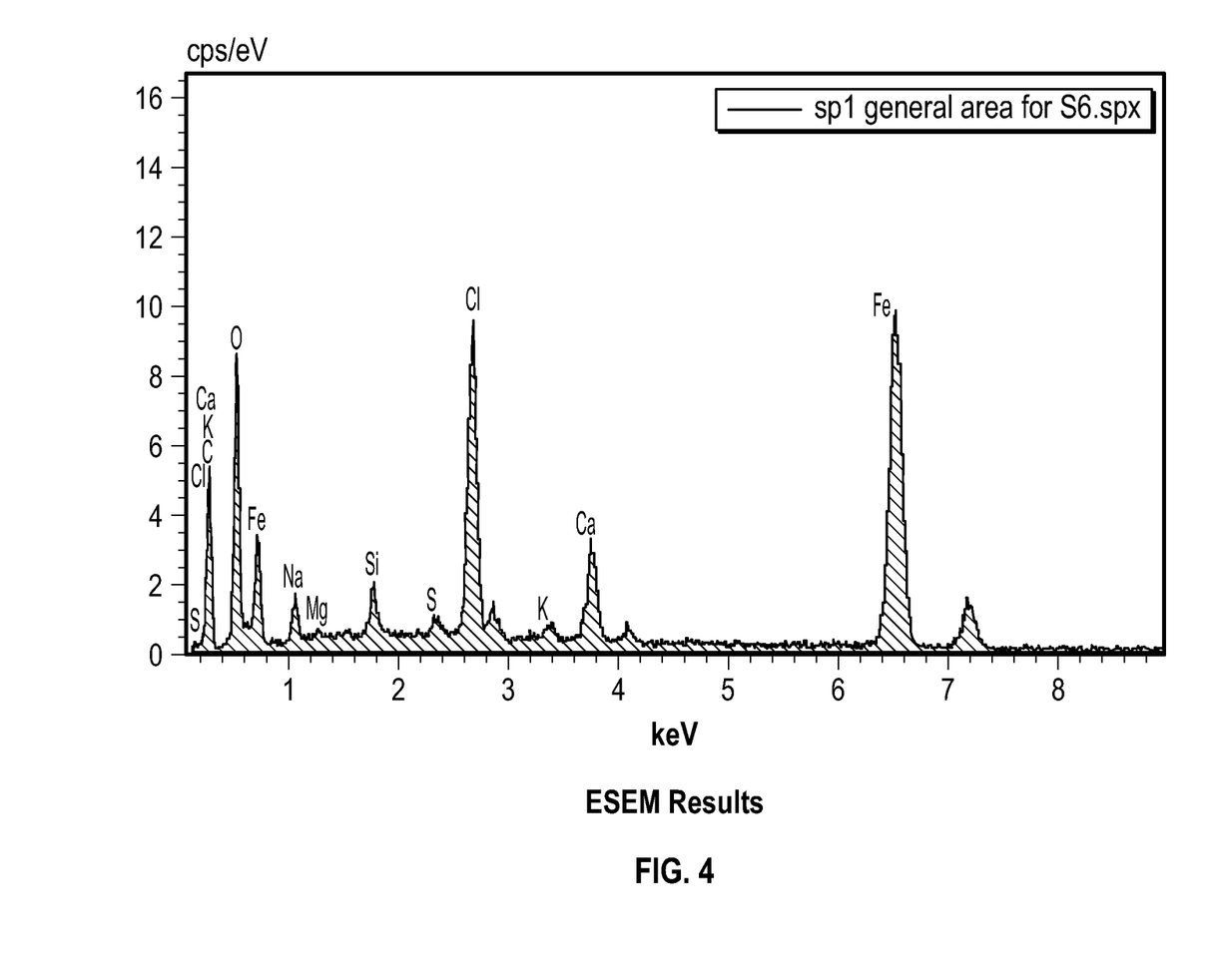
FIG. 4 is a graph of environmental scanning electron microscopy results according to one or more embodiments disclosed herein.

Several ESEM surface topographical images were acquired from the samples at different magnifications to get insight into the surface morphology. FIG. 4 shows the ESEM results. The ESEM topographical images showed that the samples to be comprised of irregularly shaped microscopic particles. The corresponding energy dispersive X-Ray microanalysis qualitative measurements revealed major and minor elements of each samples, with the results below in Table 3.

TABLE 3

ESEM results of solid filtrate

| Sample Number | Major Elements | Minor Elements |
| --- | --- | --- |
| 1 | C, O, Si, S, Cl, Fe | Na, Al |
| 2 | C, O, Si, S, Cl, Fe | Na, Mg, Al, K, Ca |
| 3 | C, O, Si, S, Cl, Fe | Na, Mg, Ca, Al |
| 4 | C, O, Si, S, Cl, Fe | Na, Mg, Al, Ca |
| 5 | C, O, Na, Si, S, Cl, Fe | Mg, Al, K, Ca |
| 6 | Na, Si, S, Cl, Fe | C, O, Al, Mg, Ca |
| 7 | C, O, Na. Si, S, Cl, Fe | Mg, Al, Ca |
| 8 | C, O, Na, Si, S, Cl, Fe | Mg, Al, Ca |

The acquired XRD data as seen in Table 4, below, indicates varying levels of the following crystalline compounds in the samples: Si- and O-rich compounds, Fe-rich oxide, Fe- and S-rich compounds.

TABLE 4

XRD results (wt %)

| | Compound | | | | | | | |
|---|---|---|---|---|---|---|---|---|
| | #1 | #2 | #3 | #4 | #5 | #6 | #7 | #8 |
| Quartz-$SiO_2$ | 97 | 66 | — | 1 | 60 | — | 2 | — |
| Halite-NaCl | 2 | 44 | 2 | 51 | — | 15 | 8 | 10 |
| Magnetite-$Fe_3O_4$ | — | — | 50 | 47 | 40 | — | 75 | 20 |
| Goethite-FeO(OH) | — | — | 20 | — | — | — | 1 | — |
| Lepidocrocite-FeO(OH) | — | — | 27 | — | — | — | — | — |
| Troilite-FeS | — | — | 1 | — | — | — | — | — |
| a-$S_8$ (Sulphur) | | | | | | | | |
| Hematite-$Fe_2O_3$ | — | — | — | — | 1 | 85 | — | 70 |
| Pyrite-$FeS_2$ | — | — | — | — | — | — | 13 | — |
| Tremolite-$Ca_2Mg_5Si_8O_{22}(OH)_2$ | 1 | — | — | — | — | — | — | — |

These analyses confirmed that part of the damage is due to corrosion products, calcium carbonate and silica, as proposed prior to treatment during initial testing.

The detailed ESEM, EDS and XRD testing prove that the treatment was successful in removing scale and corrosion products (damage) from the well and subsequently enhancing the injectivity of the well.

Accordingly, one or more methods disclosed herein have demonstrated the removal of a filter cake and/or scale build up from a well bore by contacting the filter cake and/or scale build up with a mixture of thermochemicals.

The use of the thermochemicals alone may provide some unique advantages over the solutions of the prior art. For example, the addition of the thermochemicals according to embodiments herein have been found to generate an increase in temperature without a thermochemical pulse, or in situ increase in pressure, thereby removing the filter cake or scale build up without generating microfractures within the formation. Prior art processes are designed to generate the microfractures to bring the breakdown pressure at, or near, the original breakdown pressure of the well before the formation of the filter cake or scale build up. The process according to embodiments herein have been shown to be effective without the need for a decrease in breakdown pressure.

The addition of the thermochemical alone may be sufficient to remove the filter cake by increasing the temperature within the well bore to a sufficiently high temperature to solubilize the filter cake or scale build up. In addition, the temperature generated from the thermochemical may accelerate the breakdown of the filter cake and scale build up from the well bore face, increasing the removal efficiency. Unlike the solutions in the prior art, embodiments disclosed herein using only a thermochemical may be used to breakdown filter cakes and scale build up.

In one or more embodiments disclosed herein, thermochemical may require no environmental cleanup post injection by complexing with the filter cake elements, thereby staying as a ligand with no degradation or dissociation.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A method for removing well bore damage, the method comprising:
    conducting a pre-treatment injectivity test to measure injectivity;
    performing an acid cleaning of one or more of a coiled tubing and the well bore using a hydrochloric acid mixture of 7 to 15 wt % hydrochloric acid;
    displacing the hydrochloric acid mixture with a first fresh water stream;
    injecting a composition comprising at least 10 wt % acetic acid into the well bore;
    performing gel jetting of the well bore with a gel mixture, and displacing the gel mixture with a second fresh water stream;
    injecting an organic solvent mixture into the well bore and allowing the organic solvent mixture to soak for 2 to 6 hours;
    injecting a thermochemical mixture into the well bore, thereby increasing temperature and pressure and cleaning build up from the well bore;
    soaking the thermochemical mixture in the well bore for 1 to 6 hours, producing a solubilized sludge; and
    flowing fresh water through the well bore to remove the solubilized sludge.

2. The method of claim 1, wherein the thermochemical mixture increases a temperature in the well bore by 350 to 400° F.

3. The method of claim 1, wherein the gel mixture comprises 60-120 parts per thousand xanthan to ammonium chloride.

4. The method of claim 1, wherein the organic solvent comprises one or more alcohols, fatty alcohols, fatty acids, organic acids, benzene, xylene, toluene, diesel, phenol ethoxylate, ether, cyclohexane, diisobutylketone, 2-thylhexanol, methylene chloride, dioxane, carbon disulfide, n-butanol, dimethylformamid (DMF), nitromethane, ethanol, dimethylsulfoxide, diethylene glycol, propylene glycol, n-methylpyrrolidone, isopropanol, naphthalene, or 1,2,4 trimethylbenzene.

5. The method of claim 1, further comprising conducting a post-treatment injectivity test to measure injectivity and comparing the pre-treatment injectivity to the post-treatment injectivity.

6. The method as claimed in claim 1, wherein the thermochemical mixture comprises one or more ammonium containing compounds and one or more nitrite containing compounds, wherein the one or more ammonium containing compounds are selected from the group consisting of ammonium chloride, ammonium bromide, ammonium nitrate, ammonium sulfate, ammonium carbonate, and ammonium hydroxide, and the one or more nitrite containing compounds are selected from the group consisting of sodium nitrite and potassium nitrite.

7. The method of claim 6, wherein a ratio of ammonium chloride to sodium nitrate is from 1:4 to 4:1 based on wt %.

8. The method as claimed in claim 6, wherein the injecting a thermochemical mixture into the well bore further comprises:
- injecting the thermochemical mixture at a lower depth of the well bore;
- soaking the thermochemical mixture in the lower depth of the well bore for 1 to 6 hours, producing a solubilized sludge; and
- flowing fresh water through the well bore to remove the solubilized sludge.

9. The method of claim 8, wherein the thermochemical mixture increases a temperature in the well bore by 135-155° F.

10. The method as claimed in claim 6, wherein the injecting a thermochemical mixture into the well bore further comprises:
- injecting the thermochemical mixture at a middle depth of the well bore;
- soaking the thermochemical mixture in the middle depth of the well bore for 1 to 6 hours, producing a solubilized sludge; and
- flowing fresh water through the well bore to remove the solubilized sludge.

11. The method of claim 10, wherein the thermochemical mixture increases a temperature in the well bore by 155-225° F.

* * * * *